United States Patent [19]

Hartmann

[11] Patent Number: 5,800,713
[45] Date of Patent: Sep. 1, 1998

[54] METHOD AND APPARATUS FOR INSPISSATING SOLID-LIQUID MIXTURES BY MEMBRANE TECHNOLOGY

[75] Inventor: Eduard Hartmann, Schneisingen, Switzerland

[73] Assignee: Bucher-Guyer AG, Niederweningen, Switzerland

[21] Appl. No.: 666,587

[22] PCT Filed: Oct. 10, 1995

[86] PCT No.: PCT/CH95/00229

§ 371 Date: Jun. 24, 1996

§ 102(e) Date: Jun. 24, 1996

[87] PCT Pub. No.: WO96/12553

PCT Pub. Date: May 2, 1995

[30] Foreign Application Priority Data

Oct. 25, 1994 [CH] Switzerland ............... 93 184/94-9

[51] Int. Cl.⁶ .................................................. B01D 61/00
[52] U.S. Cl. .................. 210/650; 210/641; 210/651; 210/805; 210/195.2; 210/257.2; 210/97; 210/102
[58] Field of Search ................ 210/641, 650, 210/651, 805, 195.2, 257.2, 97, 102

[56] References Cited

U.S. PATENT DOCUMENTS

| 5,110,472 | 5/1992 | Gresch | 210/651 |
| 5,112,489 | 5/1992 | Hartmann | 210/195.2 |
| 5,252,350 | 10/1993 | Hartmann | 426/490 |
| 5,549,829 | 8/1996 | Le | 210/641 |

FOREIGN PATENT DOCUMENTS

| 94/01207 | 1/1994 | WIPO . |
| 95/15209 | 6/1995 | WIPO . |

*Primary Examiner*—Ana Fortuna
*Attorney, Agent, or Firm*—Burns, Doane, Swecker & Mathis

[57] ABSTRACT

To thicken remaining residues in ultrafiltration or microfiltration for clarifying fruit juices, systems having membrane module groups (1, 2, 3) connected in series are used in the cross flow process with a residue circuit. The groups (1, 2, 3) can be individually switched on or off in succession, depending upon the present thickening gradient of the residue in the residue feed stream. By operating a suitable number of groups (1, 2, 3), an operationally favorable working pressure is kept constant at the membrane modules until as great as possible a desired value of the thickening gradient of the residue is reached. In this way, an improvement of the overall capacity of filtration systems is achieved.

17 Claims, 5 Drawing Sheets

METHOD AND APPARATUS FOR INSPISSATING SOLID-LIQUID MIXTURES BY MEMBRANE TECHNOLOGY

The invention relates to a process for thickening mixtures of solids and liquids by membrane technology by using an apparatus with a number of groups of membrane modules having a residue circuit in series, and relates as well to a device for carrying out this process.

At this time, there are not yet any known apparatuses particularly for thickening residues also known as retentate produced in ultrafiltration or in microfiltration. When clarifying fruit juices by means of filtration technologies of this kind, thickening states of up to approx. 50 vol % wet sediment content are achieved in the remaining residues, measured in the centrifuge test. That is, in the centrifuge, these residues still give off at least 50 vol % fluid. Residues of this kind are still fluid and must be further processed particularly for disposal by means of vacuum rotary filters.

Vacuum rotary filters are precoated filters and for filtration, require diatomaceous earth, which must be procured and likewise disposed of once again. Disposing of residues via the sewers is hardly possible anymore so that residue must be thickened and put in a waste dump or incinerated. In both cases, it is very significant economically to have as low as possible a water content in the residue. Only membrane apparatuses, which are equipped particularly for this purpose, seem practical for a further thickening of the residue beyond the 50 vol % mentioned. Similar ways of looking at the problem also come up in other uses of membrane technology outside the realm of fruit juice.

JOURNAL OF FOOD SCIENCE, vol. 51, no. 3, 1986, pp. 559–563 makes known an apparatus, which has metal membrane ultrafiltration with a simple passage for improved apple juice production yield. Juice production yields of up to 85% were achieved with it, but apparatuses of this kind with simple passages do not seem practical for a thickening of residues on a large scale.

Known organic membranes for filtration apparatuses, as well as pumps required for the residue circuit of apparatuses of this kind, are for the most part designed only for an operating pressure of maximally 6.5 bar. Also, higher pressures can hardly be achieved with a conventional one-stage radial pump. On the other hand, the time requirements for the entire thickening process decrease in proportion to the membrane surface used. During this thickening process, though, the viscosity of the circulating residue increases slowly at first and more rapidly toward the end.

An enlargement of the membrane surface used is suitable for thickening to a high wet sediment content, with a low time requirement. If a number of groups of known membrane modules are connected in parallel, then uneconomically high productive capacities are required for the residue circulation pumps. If this kind of groups of membrane modules are connected in series, then with the high viscosities which occur, normal operating pressures are no longer sufficient for operation.

The object of the invention, therefore, is to disclose a process for thickening solid-liquid mixtures by membrane technology and a device to carry this out, which permit a high wet sediment content of the thickened material with a limited requirement of operating time.

According to the invention, by using an apparatus with a number of groups of membrane modules having a residue circuit in series, the attainment of this object is achieved by the fact that in a first step, the thickening takes place with a membrane apparatus, which is operated in the batch process or quasi-continually, until as a result of the thickening process, the amount of thickening exceeds a first predetermined value, in that then, in a second step in the course of the thickening, at least one group of membrane modules is successively disconnected from the retentate feed stream and further thickening takes Place until a second amount of thickening value is reached, and in that then, in a third step, the thickened residue is removed from the circuit.

An apparatus for carrying out this process distinguishes itself by at least one group of membrane modules, which can be connected to or disconnected from the residue feed stream. It is suitable that a mixing device is disposed in the residue feed stream, upstream of the membrane module group that can be connected or disconnected.

Further characteristics and advantageous embodiments of the invention can be inferred from the claims.

Exemplary embodiments of the invention are explained in the following description and in the Figs. of the drawing.

DETAILED DESCRIPTION OF PREFERRED EMBODIMENTS

Figure 1:
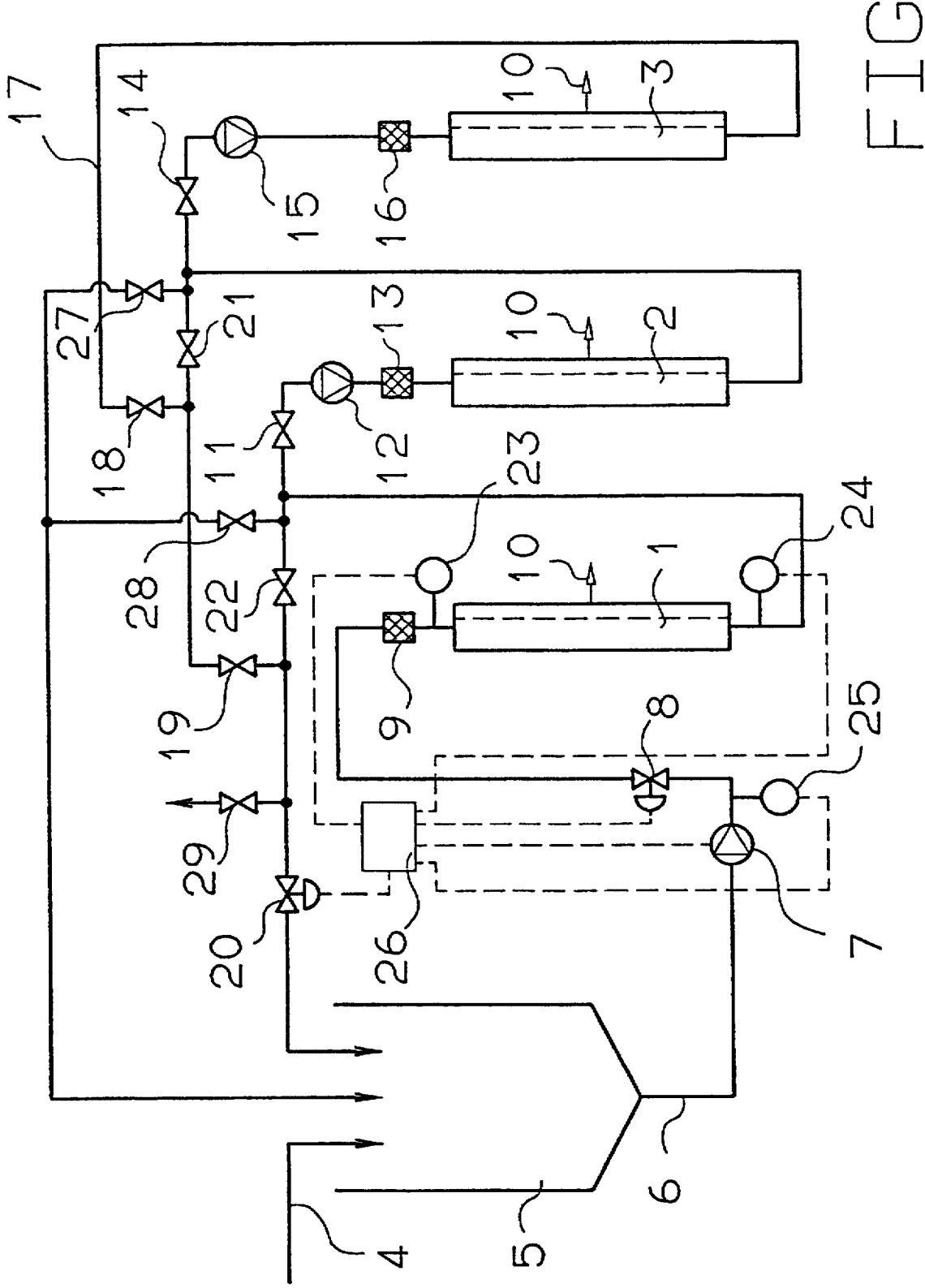
FIG. 1 shows a schematic representation of a thickening apparatus according to the invention with three groups of membrane modules in series.

A schematic representation of a thickening apparatus according to FIG. 1 shows three groups of membrane modules 1, 2, 3 for thickening solid-liquid mixtures by filtration. The fluid to be thickened travels via a supply line 4 into a collecting tank 5. From the bottom of the collecting tank 5, a line 6 leads via a circulation pump 7 having controllable speed, and via a servo valve 8 and a static mixer 9, to the inlet of the first membrane module group 1. As described more precisely below with reference to FIGS. 2 and 3, the group 1 contains a large number of membrane tubes which may be divided into a plurality of sets connected in parallel with the tubes of the individual sets being connected in series. The fluid to be thickened flows through these tubes.

The solid contents in the fluid are retained in a residue by the walls of the membrane tubes, which walls are embodied as filtration membranes, while fluid to be separated flows through the membranes and is collected in permeate lines, which are symbolized by the arrows 10, and is removed. The residue from membrane module group 1 exits through a retenate outlet and travels via a stop valve 11, another circulation pump 12, and another static mixer 13, into the feed inlet of membrane module group 2. From the retentate outlet of group 2, it flows via another stop valve 14, a circulation pump 15, and a static mixer 16 into the feed inlet of membrane module group 3.

The groups 1, 2, and 3 all have the same design and the same function, but can differ in the number of membrane modules. From group 3, the residue travels via a line 17, two stop valves 18, 19, and a servo valve 20, and back into the collecting tank 5 again, after fluid contents removed in the permeate lines 10 have been separated.

As shown in FIG. 1, another stop valve 21, 22 is respectively associated with each of the stop valves 14, 11. By closing valve 14 and opening valve 21 or by closing valve 11 and opening valve 22, now the membrane module groups 3 or 2 can be disconnected from the residue feed stream. To measure the pressure in the residue stream, pressure sensors 23 or 24 are provided respectively at the inlet or outlet of membrane module group 1, and the through flow can be detected with a through flow meter 25 at the outlet of the controllable circulation pump 7.

The signal lines of the sensors 23, 24, 25 and the control lines of the servo valves 8, 20 are connected to a regulating device 26.

In the exemplary embodiment described thus far, the thickening process now proceeds as follows:

The process starts with the three membrane module groups 1, 2, 3. There, the valves 11, 14, 18, 19, and the servo valve 20 are open and the valves 22, 21 are closed. The regulating device 26 regulates the through flow to 90 m³/h in accordance with the signal of the through flow meter 25 via the pump 7 with controllable speed. The servo valve 20 is then closed in accordance with the signal of the sensor 23 until there is a pressure of 6 bar at the inlet of group 1.

Residue with a wet sediment content of 30% flows through the membrane module groups 1, 2, 3, where permeate is separated and removed via the lines 10. With continued running time, the wet sediment content and at the same time, the viscosity - increases in the residue circuit. The pressure difference increases via the groups 1, 2, 3 and the regulating device 26 opens the servo valve 20 wider so that the predetermined desired pressure of 6 bar is kept constant at the sensor 23 and is not exceeded.

These valves settings provide a first retentate circuit for a first stage or interval of the thickening process. In this first retentate circuit the mixture is recycled again and again through a loop from the tank 5 to the feed inlet of the membrane module group 1, over the membranes is module group 1, out of the retentate outlet of group 1, on to the feed inlet to the successive additional membrane module groups (e.g., groups 2 and 3) where additional separation takes place, and from the retentate outlet of the last of these additional membrane modules groups back to the tank 5.

As soon as the servo valve 20 is completely open, the pressure at the sensor 23 increases. If it reaches 6.5 bar, then, in accordance with the preselection in the regulating device 26, to limit the pressure increase, either the through flow is first reduced by reducing the speed of the circulation pump 7, or group 3 is immediately switched off. In this operating state, the residue in the circuit and in the collecting tank 5 has of approximately 60% wet sediment content. The switching off of membrane module groups to achieve a high amount of thickening is essentially more effective than a reduction of the overflow speed at the membranes by means of the reduction of the through flow mentioned above. Usually, the residue materials show a strong intrinsically viscous behavior. A reduction of the overflow speed then leads immediately to a viscosity increase and therefore, the pressure difference between inlet and outlet of the groups decreases only slightly.

A The further thickening stage of the process now takes place utilizing only groups 1 and 2. In this second interval, the valve settings are such as to provide a second retentate circuit in which the solid-liquid mixture is recycled through a loop passing from tank 5, to and through the membrane module group 1, then to and through the membrane module group 2, and then back to the tank 5. As already described, the intended pressure at the sensor 23 is kept constant until group 2 is switched off. The switching off of group 2 proceeds advantageously so that the residue flowing into groups 1, 2 is immediately brought to approximately 20% wet sediment content by the additional direct supply of water, or is displaced by being rinsed with nearly zero parts wet sediment content by means of the additional interruption of the supply from the collecting tank 5.

Figure 2:
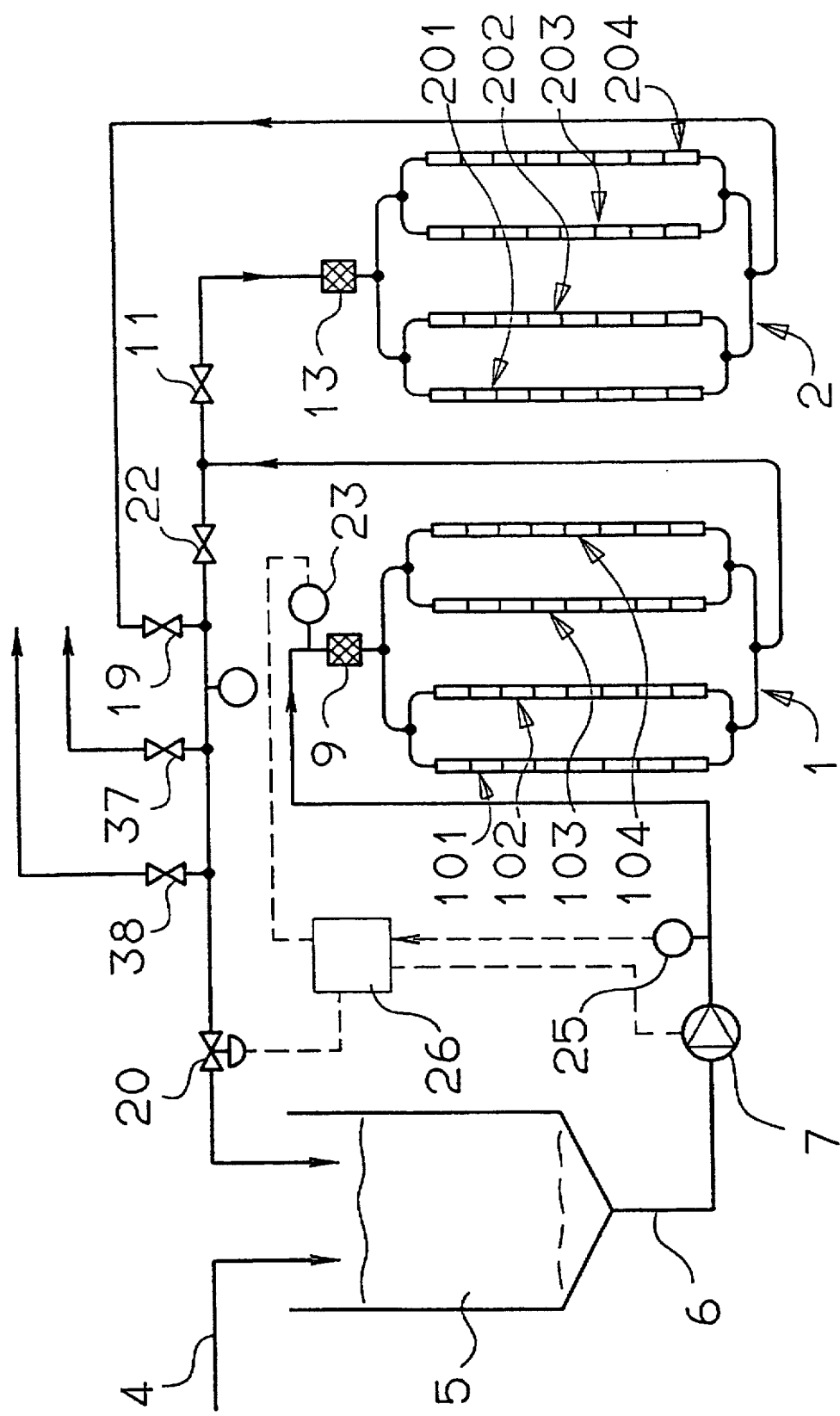
FIG. 2 shows a schematic representation of a thickening apparatus according to the invention with two groups of membrane modules in a multi-pass embodiment.

There is the danger that deposits with increased wet sediment contents may loosen in a delayed fashion from the zone between the valves 11, 22 and stop up individual membrane tubes in membrane module group 2. This is prevented by the fact that the residue flows through the mixer 13 preceding group 2, which mixer once again produces an even distribution of the sediment content in the tube cross section. In multi-pass apparatuses, the mixer 13 is followed by a symmetrical manifold, as shown in FIG. 2. The displaced residue is either conveyed directly back into the collecting tank 5 via valves 27, 28, or is removed via a valve 29. Immediately afterward, valve 22 is opened and valves 11, 19 are closed.

The further thickening process is now carried out with only membrane module group 1. As a rule, group 1 has the same or a smaller number of membrane modules per pass than group 2. At the same viscosity of the residue, therefore, the pressure decrease via group 1 is only about half as great as the one when groups 1 and 2 are operated together.

Thanks to this lesser pressure loss, the thickening can now be continued further with group 1 alone. The quantity and pressure regulation proceeds basically the same as in the operation with groups 1 and 2 together. After the servo valve 20 is already completely open, at a constant pressure of 6.5 bar measured with the sensor 23, the residue feed stream measured at the through flow meter 25 reduces to approximately 45 m³/h. The residue in the collecting tank 5 is then thickened to approximately 85% wet sediment content. This residue is now removed by opening valve 29 and closing servo valve 20. Then a re-thinning of the residue remaining in group 1 is carried out, before groups 2 and 3 are switched on again by opening valves 11, 14, 18, 19 and closing valves 22, 21.

Figure 4:
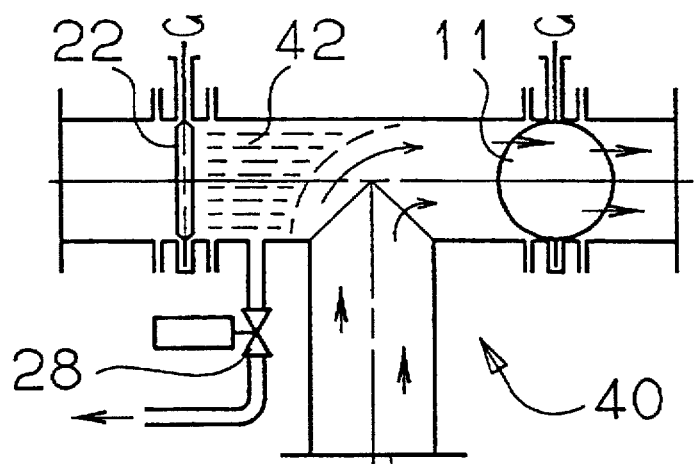
FIG. 4 shows a schematic representation of a valve for connecting or disconnecting a group of membrane modules in an apparatus according to one of FIGS. 1 to 3.
Figure 5:
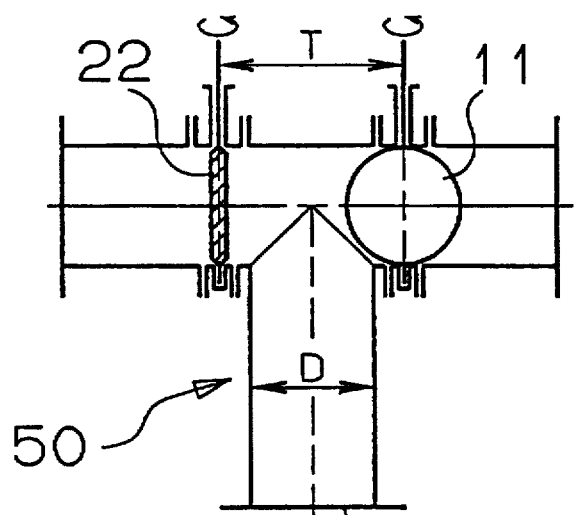
FIG. 5 shows a schematic representation of another valve for connecting or disconnecting a group of membrane modules in an apparatus according to one of FIGS. 1 to 3.
Figure 6:
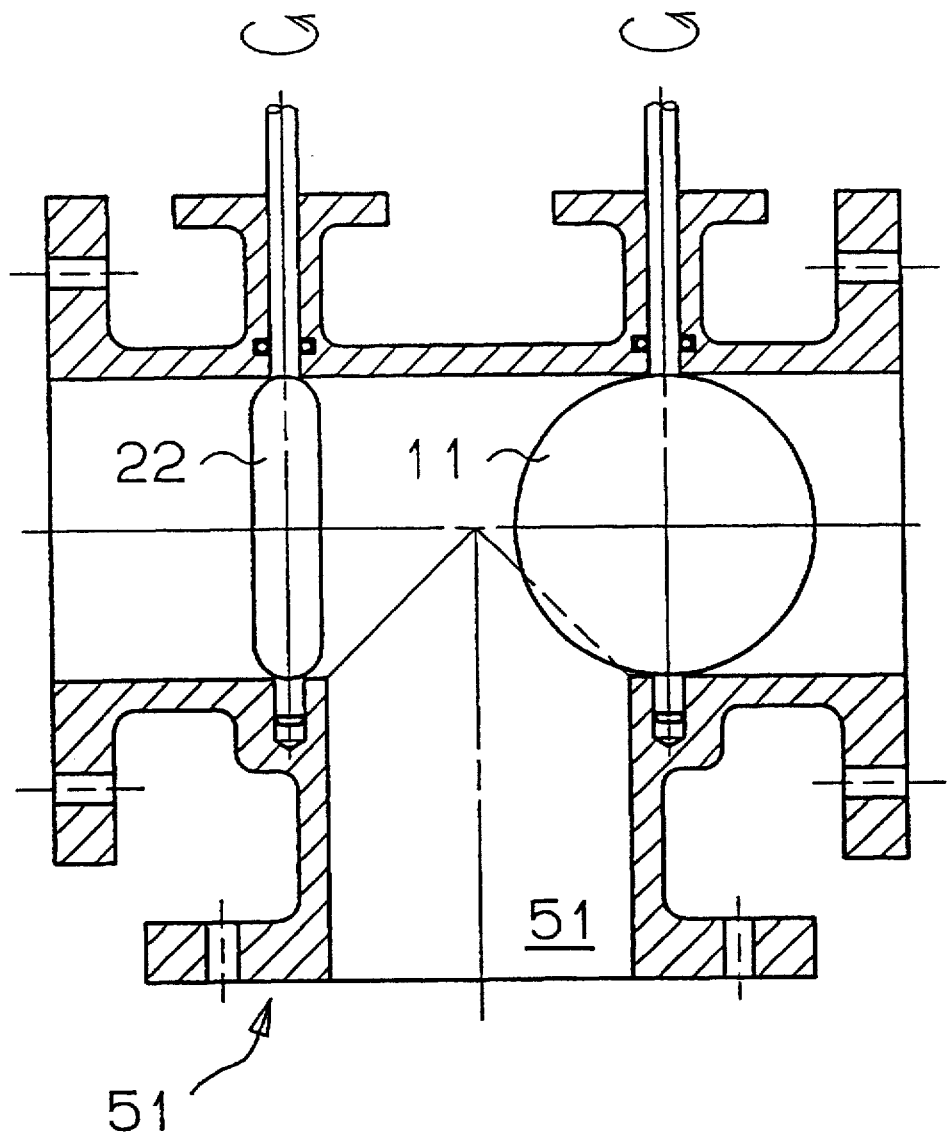
FIG. 6 shows a cross section of the valve according to FIG. 5 for connecting or disconnecting a group of membrane modules in an apparatus according to one of FIGS. 1 to 3.

The danger that deposits with increased wet sediment contents loosen in a delayed fashion from the zone between the valves 11, 22 or 14, 21 and stop up individual membrane tubes in membrane module groups 2 or 3 is reduced by an embodiment of the valves according to FIGS. 4, 5, and 6. The branch part 40 shown in FIG. 4 contains the valves 11, 22, 28 according to FIG. 1. The residue stream from group 1 comes through an inlet 41 and goes through the open valve 11 to group 2, while highly viscous sediment contents are deposited in a dead zone 42 upstream of the closed valve 22. At appropriate times during the thickening process, these sediment contents are conveyed back via valve 28 into the residue circuit of the apparatus at a point where the risk of a membrane module stoppage is slight.

The embodiment of the valves 11, 22 according to FIG. 5 includes a branch part 50 with an inlet 51. The distance T of the rotational axes of the valves 11, 22 is only slightly larger than the diameter D of the inlet 51, preferably T/D=1.2 to 1.5,
so that no dead zone 42 of the kind shown in FIG. 4 occurs. FIG. 6 shows a cross section of the branch part 50 according to FIG. 5.

In the schematic representation according to FIG. 2 of a thickening apparatus according to the invention, the components which correspond to those in FIG. 1 are provided with the reference numerals given there. The apparatus according to FIG. 2 contains only two membrane module groups 1, 2, whose function has already been described in conjunction with FIG. 1. According to FIG. 2, a valve 37 is provided for the displacement of the residue from group 2, which has been thickened to of approximately 60%, which displacement is executed when group 2 is switched off. The removal of the residue after thickening to approximately 85% wet sediment content is carried out according to FIG. 2 by means of opening a valve 38 and closing the servo valve 20.

FIG. 2 shows the membrane module groups 1, 2 in a four-pass embodiment. Group 1 contains the parallel-connected passes 101, 102, 103, 104, and group 2 contains the parallel-connected passes 201, 202, 203, 204. Each of the passes of group 2 is constructed of eight membrane modules in series, as shown more precisely in FIG. 3. Only one common circulation pump 7 is used for both groups 1, 2.

Figure 3:
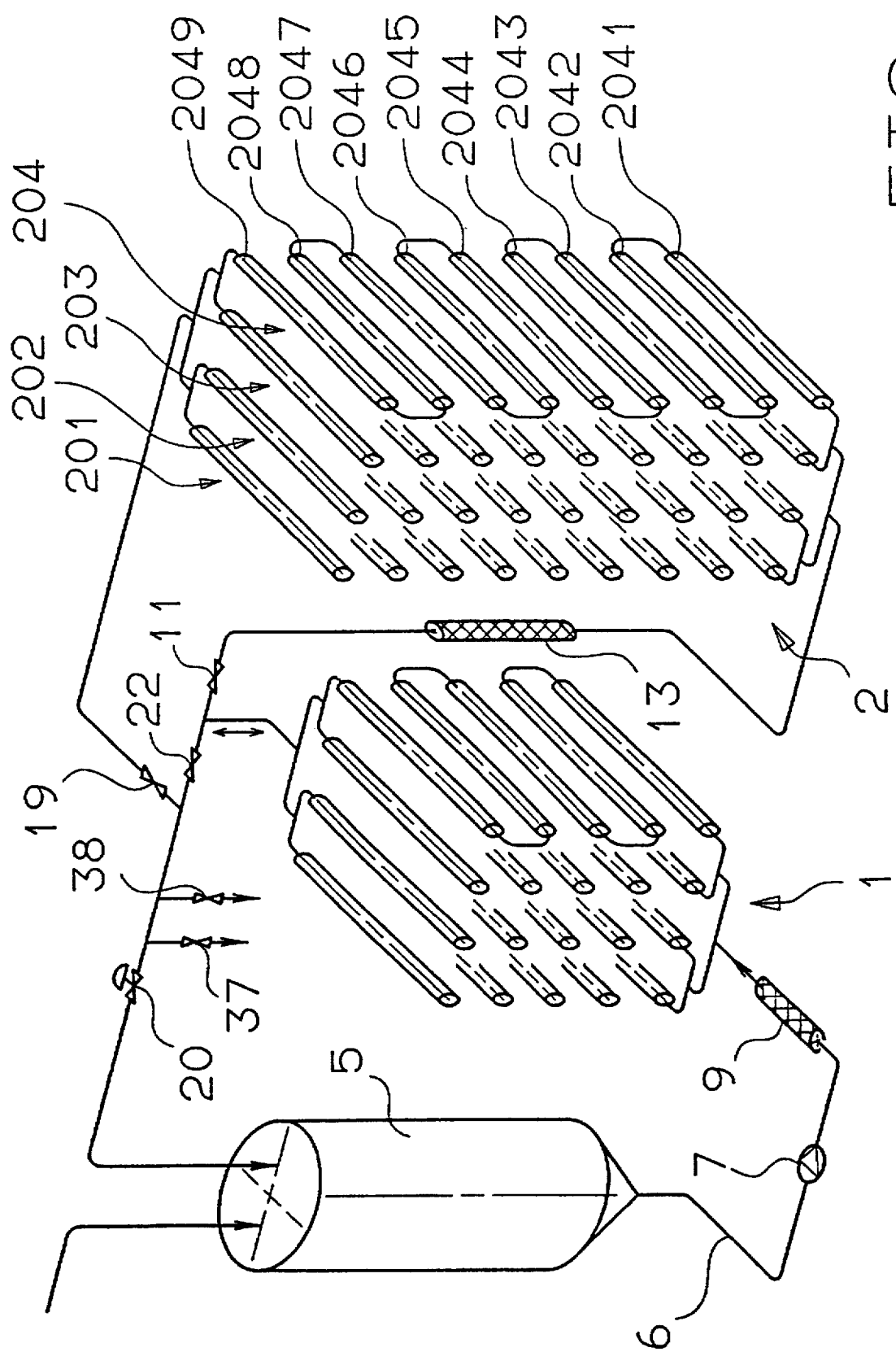
FIG. 3 shows a schematic representation of a disposition of membrane modules in a thickening apparatus according to the invention, according to FIG. 2.

FIG. 3 schematically represents the spatial disposition of the membrane modules in a thickening apparatus according to FIG. 2 in an alternative embodiment which contains only five membrane modules in series in each pass of group 1, but contains nine in each pass of group 2. The remaining components of FIG. 3 are indicated with the reference numerals which correspond to those in FIG. 2. All membrane modules, of which the ones in pass 204 are indicated as 2041 to 2049, contain as a rule one bundle of nineteen membrane tubes, which are connected in parallel and are of the type already mentioned in conjunction with FIG. 1. The permeate lines 10 of groups 1, 2 according to FIG. 1 are not shown in FIG. 3.

As shown in FIG. 3, the residue lines for the individual passes 201 to 204 are brought together hierarchically in pairs. Symmetrical manifolds are used for this, which likewise are used to bring the residue lines together into a single line at the inlet and outlet of each group 1, 2. The connecting or disconnecting of the membrane module groups 1, 2 takes place at these common single lines.

From the above description of the embodiment and function of apparatuses according to the invention according to FIGS. 1 to 3, as well as the process for operating them, it follows that according to the object, the main purpose of the switching on or off of membrane module groups is to improve the overall output of the filtration apparatus. The filtration output increases in proportion to the size of the membrane surface used. Depending upon the instance of use, the time requirement for the entire thickening process is up to 20 hours. During this time, the viscosity of the circulating residue increases slowly at first and more rapidly toward the end of the process. By switching on a membrane module group 2 or 3 in the lower viscosity range, the present filtration output is more often than not improved by a factor of two or more.

I claim:

1. A batchwise or quasi-continuous process for thickening solid-liquid mixtures by membrane technology, using an apparatus with a plurality of groups (1, 2, 3) of membrane modules and a retentate circuit passing successively through said plurality of groups of membrane modules in series, said process comprising operating all of said membrane module groups (1, 2, 3) in series during a first interval until as a result of the thickening process, the retentate is thickened to a first predetermined, and then, in a second interval in the course of thickening, at least one membrane module group (2, 3) is disconnected from the retentate circuit and the retentate is thickened to a second value, and then, in a third interval the thickened retentate is removed from the circuit.

2. The process according to claim 1, wherein the degree of thickening of the retentate is detected by measuring the pressure drop in the retentate passing through at least one membrane module group (1, 2, 3).

3. The process according to claim 1, wherein the degree of thickening of the retentate is determined by measuring the through flow in the retentate circuit.

4. The process according to claim 1, wherein the degree of thickening of the retentate is determined by measuring its viscosity.

5. The process according to claim 1, wherein the degree of thickening of the retentate is determined by measuring its cloudiness.

6. A system for thickening solid-liquid mixtures comprising a plurality of groups of membrane modules each of which groups has a feed inlet, a retentate outlet, and a plurality of membrane modules between said inlet and said outlet; said groups of membrane modules being connected together in series in a retentate recycle circuit with the retentate outlet of one group of modules being connected to the feed inlet of a succeeding group of modules and the retentate outlet of each of said groups of membrane modules being switchable to communicate with the feed inlet of the first of said groups of membrane modules; and means for disconnecting the feed inlet of a succeeding group of modules from the retentate outlet of a preceding group of modules and shortening said retentate recycle circuit after the solid-liquid mixture has reached an intermediate stage of thickening to isolate said succeeding group of modules from said retentate circuit.

7. A system according to claim 6, further comprising a mixing device disposed in the feed stream passing into the feed inlet of said succeeding membrane module group from the retentate outlet of said preceding membrane module group.

8. A system according to claim 7, wherein the mixing device is embodied as a static mixer.

9. A system according to claim 8, wherein said succeeding membrane module group is embodied as a multi-pass group, and wherein said feed inlet of said succeeding group is connected to all of the individual passes of such multi-pass group of membrane modules.

10. A system according to claim 9, wherein said individual passes of said multi-pass group are ordered hierarchically in groups with branches for each pair.

11. A system according to claim 6, wherein said disconnecting means includes valve means having at least one outlet opening provided with at least one additional switching element through which thickened retentate may be drained to reduce risks of clogging.

12. A system according to claim 11, wherein said outlet opening communicates directly or indirectly with the retentate flow.

13. A system according to claim 6, comprising at least one circulation pump connected to the feed inlet of said succeeding membrane module group.

14. A system according to claim 6, wherein said system has a device for regulating the magnitude of the retentate flow circulating in it.

15. A system according to claim 14, wherein said device for regulating the retentate flow includes a retentate pump with regulatable speed.

16. A batch process for thickening a solid-liquid mixture by membrane technology, comprising
- a first stage in which the mixture is thickened to a predetermined degree by recycling the mixture a plurality of times through a first retentate circuit leading first through one group of membrane modules, then through at least one additional group of membrane modules, and then back to said one group of membrane modules to separate permeate from the mixture in each of said groups of membrane modules; and
- a second stage in which the mixture produced by the first stage is further thickened by recycling the mixture through a second retentate circuit that includes said one group of membrane modules but excludes at least one additional group of membrane modules that was included in said first retentate circuit.

17. A process according to claim 16, wherein said first stage includes recycling the mixture through a retentate circuit leading successively through at least three groups of membrane modules in series and wherein said second stage includes recycling the mixture through a retentate circuit leading successively through the first two groups of membrane modules while the last group of membrane modules of the series is disconnected from the retentate circuit.

* * * * *